United States Patent [19]

Roche

[11] 4,286,952
[45] Sep. 1, 1981

[54] EDUCATIONAL TOY

[76] Inventor: Mary E. Roche, R.R. #1, Box 435A, Markelville, Ind. 46056

[21] Appl. No.: 108,977

[22] Filed: Jan. 2, 1980

[51] Int. Cl.³ .............................................. G09B 1/06
[52] U.S. Cl. .................................... 434/259; 273/156
[58] Field of Search ............. 35/22 R, 22 A; 273/156, 273/157 R; 434/81, 98, 259

[56] References Cited

U.S. PATENT DOCUMENTS

| | | | |
|---|---|---|---|
| 741,903 | 10/1903 | Gates | 35/22 A UX |
| 2,584,601 | 2/1952 | Mauser | 434/188 X |
| 2,659,163 | 11/1953 | Albee | 273/157 R X |
| 3,191,937 | 6/1965 | Kropinski | 273/157 R X |
| 3,375,009 | 3/1968 | Stubbmann | 273/156 |
| 3,510,964 | 5/1970 | Dahners et al. | 35/22 A |

*Primary Examiner*—Anton O. Oechsle
*Attorney, Agent, or Firm*—John H. Calhoun, Jr.

[57] ABSTRACT

An educational toy comprising an open top rectangular box having a plurality of like bottom sockets in a spaced apart relationship in its bottom and a truncated corner post at each interior corner, a plurality of rectilinear platform blocks of different heights each of which is provided with a mounting post that extends from and perpendicular to the bottom thereof and which post is adapted to be removably inserted into any bottom socket, a color board adapted to be removably placed in the top of the box and to sit on the truncated corner posts and having a plurality of distinctively colored figures equal in number to the number of bottom sockets painted or otherwise provided on one surface thereof in a spaced apart relationship, and a grate adapted to be removably placed in the top of the box and to sit on the truncated corner posts and having a plurality of spaced apart openings therein equal in number to the number of bottom sockets and adapted to receive a plurality of game blocks slidably inserted lengthwise therethrough, and a plurality of game blocks having heights inversely proportioned in relation to the heights of the plurality of platform blocks and painted or otherwise provided on their ends with distinctive colors corresponding to the colors on the color board, and adapted to be slidably inserted lengthwise through the openings in the grate.

4 Claims, 1 Drawing Figure

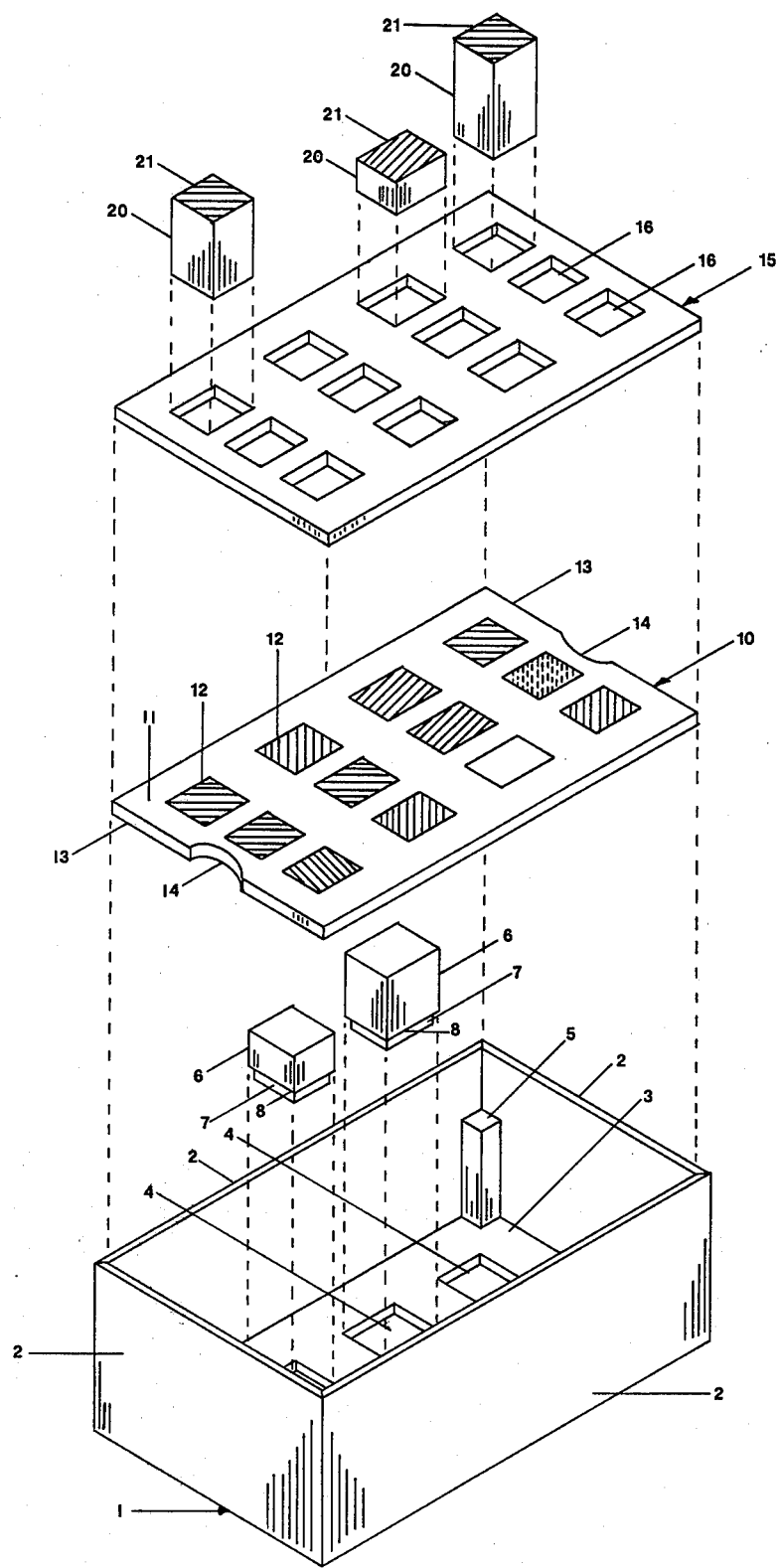

EDUCATIONAL TOY

BACKGROUND OF THE INVENTION

This invention relates to educational toys and more particularly to educational toys for teaching small children to recognize similarities and differences in sizes and shapes of objects and in colors. Toys for simultaneously amusing and teaching a child are well know in the art as illustrate by U.S. Pat. No. 2,659,163 issued to Albee on Nov. 17, 1953 which shows a game apparatus for familiarizing children with geometric shapes and shades of color, U.S. Pat. No. 3,375,009 issued to Stubbmann et al on Mar. 26, 1968 illustrates a peg leveling game, and U.S. Pat. No. 3,510,964 issued to Dahners et al on May 12, 1970 illustrates an educational color case useful for teaching children colors by visual color recognition or descriptive name or both. U.S. Pat. No. 3,496,652 issued to Wolfner et al on Feb. 24, 1970 illustrates a bottle toy designed to teach children to recognize similiarities in color, shape, and functions of objects, and U.S. Pat. No. 3,775,868 issued to Moore on Dec. 4, 1973 illustrates a form board for teaching children different spatial and visual relationships, similiarities and differences. Many other types of educational toys are also known in the art such, for example, as jig saw puzzles, peg boards, coloring books, and word games.

SUMMARY OF THE INVENTION

An object of my invention is to provide an educational toy to simultaneously amuse a child and teach the child to recognize similiarities and differences in distances, similiarities and differences in the sizes and shapes of objects, and to recognize colors. Another object of my invention is to provide an educational toy that is of such simplicity that a small child will not be baffled by its construction and operation, while at the same time providing variations in playing conditions to amuse and entertain a child for an extended period of time without the child becoming bored. Another object of my invention is to provide an educational toy that will withstand dropping, throwing, or biting by a child. Another object of my invention is to provide an educational toy having a sufficient number of game pieces to capture and hold a child's interest. Another object of my invention is to provide an educational toy wherein the game pieces are large enough to be easily seen, large enough to be easily handled and manipulated by a child, large enough to be easily found if lost, too large to be swallowed by a child, and having no sharp points or edges that might injure a child. Another object of my invention is to provide an educational toy that is reasonably compact and can be conveniently stored. Another object of my invention is to provide an educational toy that is simple in construction, strong, rugged, durable, reliable, well adapted for the purposes for which it is designed, and inexpensive to produce. Other objects and advantages of my invention will become apparent from a consideration of the following detailed description taken in connection with the accompanying drawings wherein a preferred embodiment of the invention is shown. It should be understood that the invention is not limited to the details disclosed but includes all such variations and modifications as fall within the spirit of the invention and the scope of the appended claims.

The educational toy of the present invention comprises an open top box having a plurality of openings or sockets in the bottom of the box; a plurality of platform blocks of different lengths and each having a post extending from the bottom thereof; a grate having a plurality of openings therethrough equal in number to the number of sockets in the bottom of the box and located in the grate so that each opening will be positioned directly above a socket in the bottom of the box when the grate is placed in the top of the box for playing with the toy; and a plurality of game blocks of different lengths. The posts on the bottoms of the platform blocks are inserted randomly into the sockets in the bottom of the box to provide a randomly varying pattern of platforms extending upward from the bottom of the box. One or more sockets may be left vacant, in which case the bottom of the box serves as a platform for the vacant position. A vertically standing truncated corner post is provided in each corner of the box for supporting the grate. The grate is placed in the top of the box and is supported on the corner posts in such manner that each opening in the grate is positioned directly over a socket position. The child then looks through an opening in the grate to determine the height of the platform below, and selects a game block of such length that when it is inserted lengthwise through the opening in the grate and set of the platform below, the top of the game block will extend a predetermined and uniform amount above the top surface of the grate. This process is repeated until a block of the correct length has been inserted through each opening in the grate. Thereafter the child may disassemble the toy by removing the grate, game blocks and platform blocks from the box. Random placement of the platform blocks in the bottom of the box causes the child to be confronted with a different set of playing conditions each time that he or she plays with the toy.

Also provided is a color board having a plurality of colored figures on one surface thereof. The color board may be placed on the corner posts in the same manner as the grate and with the colored figures positioned on the top surface of the color board. The grate may then be placed on top of the color board. The colored figures are positioned on the color board so that they will be visible through the openings in the grate when the color board and grate are mounted in the top of the box as described. The ends of each game block are painted or otherwise provided with a distinctive color matching one of the colors visible through one of the openings in the grate. The child may match up the colors on the game blocks with those on the color board by standing each game block in the grate opening which exhibits the corresponding color on the color board beneath that grate opening.

In one embodiment of the invention eight platform blocks are provided and the blocks are of two different lengths. Twelve game blocks are provided, and the game blocks are of three different lengths. In that embodiment, a child may place the color board and grate in the top of the box as previously described, and thereafter stand the game blocks in the grate openings, grouping the game blocks according to length. In another embodiment of the invention the game blocks all have different lengths, and in that embodiment a child may stand the game blocks in the grate openings arranging the blocks in any of several block-length dependent patterns.

The truncated corner posts are made of such length that when the color board and the grate are both placed in the top of the box the top surface of the upper most of the two will be flush with the top of the box. The toy may be conveniently stored by placing the platform blocks and game blocks in the box and placing the color board and grate in the top of the box.

In the preferred embodiment illustrated herein the box is shown as rectangular and the sockets are shown as rectangular openings through the bottom of the box. It can be readily seen that the box could be of some shape other than rectangular, and that the sockets could be of some shape other than rectangular, or that some other means for positioning and holding the platform blocks might be substituted for the rectangular openings in the bottom of the box without exceeding the scope of the present invention. In the illustrated embodiment four corner posts are used to support the color board and grate in the top of the box, but brackets or other means of support could be substituted for the corner posts within the scope of the present invention. In the illustrated embodiment the platform blocks and game blocks are shown as rectilinear in form, and the colored patterns on the color board and the openings in the grate as shown as rectangular in shape. The blocks could be of some other form such, for example, as cylindrical, and the colored patterns and grate openings could be of some other shape such, for example, as circular, within the scope of the present invention.

BRIEF DESCRIPTION OF THE DRAWING

A preferred embodiment of the present invention is illustrated in the accompanying drawing, in which the FIGURE provided is an exploded perspective view of the educational toy of the present invention.

DESCRIPTION OF THE PREFERRED EMBODIMENT

Referring now to the drawing in greater detail, the FIGURE illustrates a preferred embodiment of the educational toy of the present invention. Provided is a special purpose open top rectangular box 1 having four sides 2, a bottom 3 having a plurality of like sockets 4 located in spaced apart relationship therein, and four like truncated corner posts 5. The box may be made of wood, plastic or other suitable material. The corner posts 5 in the illustrated embodiment are rectilinear in form and are seated against the bottom 3 of the box 1, however they could be of other geometric form, and as will become evident below, and they need not extend all the way to the bottom of the box, nor is it necessary that they be located in the corners of the box 1. Each socket 4 of the plurality of sockets in the bottom 3 of the box 1 comprises a rectangular opening through the bottom 3 of the box 1 adapted to receive a rectangular post slidably and removably inserted therein. In the illustrated embodiment twelve sockets are shown arranged in three rows of four sockets each.

Also provided is a plurality of rectilinear platform blocks 6 each of which has a bottom surface 8 and a rectilinear post 7 integral therewith or mounted thereon and extending downward from and perpendicular to the bottom surface 8 thereof. The said posts 7 are adapted to be slidably and removably inserted or plugged into any socket 4 of the plurality of sockets. The posts 7 serve to locate, orient and fix the positions of the platform blocks 6 relative to the bottom 3 of the box 1.

Also provided is a rectangular flat color board 10 proportioned in length and width so that it may be removably inserted into the top of the box and will substantially cover the top of the box. The top surface 11 of the color board 10 is provided in a spaced apart relationship by painting or other suitable means with a plurality of distinctively colored figures 12, and in the illustrated embodiment the said figures 12 are rectangular in shape and are arranged in three rows of four colored rectangles each, and are so positioned on the color board that when the color board 10 is placed in the top of the box as shown in FIG. 1 each colored rectangle 12 will be positioned directly above one of the plurality of sockets 4 in the bottom 3 of the box 1. Two opposite ends 13 of the color board 10 are provided with recesses 14 which allow a user's fingers to be inserted under the color board 10 for lifting the said board 10 from the top of the box 1.

The function of the corner posts 5 is to support a color board 10 and a grate 15 to be further described below. In the illustrated embodiment the corner posts 5 are vertically standing rectilinear members longer than the longest platform block but shorter than the depth of the box positioned in the corners of the box 1 and having one end thereof seated against the bottom 3 of the box 1. After the platform blocks 6 are randomly placed in the bottom 3 of the box 1 the color board 10 is placed on top of the corner posts 5 with the surface 11 of the color board 10 having the colored figures 12 provided thereon on top, thereby substantially covering the top of the box with the color board. It will be apparent that the corner posts 5 need not extend to the bottom 3 of the box 1 provided that the said posts 5 are securely mounted to the walls 2 of the box 1. It will also be appreciated that the corner posts 5 could be mounted vertically on the bottom 3 of the box 1 at locations other than the corners of the box, or that brackets of suitable design mounted on the walls 2 of the box 1 might be used to support the color board 10.

Also provided is a rectangular, flat grate 15 proportioned in length and width to be removably inserted into the open top of the box 1 and to sit on the corner posts 5 and to substantially cover the top of the box 1. A plurality of openings 16 in spaced apart relationship are provided in the grate 15, and in the illustrated embodiment the said openings 16 are rectangular in shape and are arranged in three rows of four openings each so located that when the grate 15 is removably inserted into the top of the box 1 as shown in FIG. 1 each opening 16 will be positioned directly above one of the plurality of sockets 4 in the bottom 3 of the box 1.

A plurality of game blocks 20 is provided, and in the illustrated embodiment the game blocks 20 are rectilinear in form, and each game block is adapted to be slidably and removably inserted lengthwise through any of the plurality of openings 16 in the grate 15. The lengths of the game blocks 20 are inversely proportioned relative to the lengths of the platform blocks 6.

The educational toy of the present invention may be operated in a plurality of modes. One mode of operation requires the user to randomly insert the posts 7 on the bottoms 8 of the platform blocks 6 into the sockets 4 in the bottom 3 of the box 1 to provide a randomly varying pattern of platforms extending upward from the bottom of the box. The number of platform blocks 6 may be larger than, equal to, or less than the number of sockets 4. One or more sockets 4 may be left vacant, in which case the bottom 3 of the box 1 serves as a platform for each vacant position. Thereafter the grate 15 is removably inserted into the top of the box 1 and placed on top of the corner posts 5 so that each opening 16 in the grate 15 is located directly above a platform. The user then looks through an opening 16 in the grate 15 to determine the height of the platform below, and selects a game block 20 of such length that when it is inserted lengthwise through the opening 16 in the grate 15 and is set on the platform below, the top of the game block 20 will a predetermined and uniform amount above the top surface of the grate 15. This process is repeated until a game block 20 of proper length has been inserted through each opening 16 in the grate 15 and placed on a platform below. Thereafter the user may disassemble the toy by removing the grate 15, game blocks 20 and platform blocks 6 from the box 1. Random placement of the platform blocks 6 in the bottom 3 of the box 1 causes the user to be confronted with a different set of playing conditions each time the toy is used.

The ends 21 of each game block 20 are provided by painting or other suitable means with a distinctive color matching one of the colors on the color board. An alternate mode of operation requires the user to set the color board in the top of the box and on top of the corner posts 5 with the surface 11 of the color board 10 on top, thereby substantially covering the top of the box 1 with the color board 10. The grate 15 is then placed in the top of the box 1 and on the color board 10. The rectangular colored figures 12 on the top surface 11 of the color board 10 will be visible through the openings 16 in the grate 15. The user may then match up the colors on the ends of the game blocks 20 with the colors on the color board 10 by standing each game block 20 in the grate opening 16 which exhibits the same color on the color board 10 beneath that grate opening 16.

Two or more of the platform blocks 6 might be made the same length, in which case a like number of game blocks 20 would have the same length, since the lengths of the game blocks 20 are inversely proportioned relative to the lengths of the platform blocks 6. Yet another mode of operation for the toy requires the user to stand the game blocks 20 in the grate openings 16 and on the color board 10 and in addition to group the game blocks 20 according to their lengths. In another embodiment of the invention the game blocks 20 all have different lengths, and in that embodiment a user may arrange the game blocks 20 in the grate openings 16 and on top of the color board 10 in order of increasing length, order of decreasing length or in any of serveral other block-length dependent patterns.

The truncated corner posts 5 are made of such length that when the grate 15 and color board 10 are both placed in the top of the box and are set on the said corner posts 5 the top surface of the upper most of the two will be flush with the top of the box 1, thus providing maximum space for storing the platform blocks 6 and game blocks 20 in the box 1 and also providing a convenient cover for the box 1 when the toy is not being used.

Having thus described my invention, what I claim is:

1. An educational toy comprising an open top box having a bottom adapted to receive a plurality of platform blocks removably inserted therein, said box being provided with support means mounted therein which support means are adapted to support a color board and a grate, a plurality of platform blocks adapted to be removably inserted into the said bottom of the said box and adapted to receive a plurality of game blocks removably placed thereon, a plurality of game blocks wherein a portion of each block is provided with a distinctively colored figure corresponding in color to a color of a figure on a surface of a color board, the said game blocks being adapted to be slidably inserted through a plurality of openings in a grate and adapted to be removably placed on the aforesaid plurality of platform blocks and on a surface of a color board, a color board adapted to be removably inserted into the aforesaid top of the aforesaid box and to sit on the aforesaid support means and to receive a grate and the aforesaid plurality of game blocks removably placed thereon, and a grate having a plurality of openings therethrough and adapted to be removably inserted into the aforesaid top of the aforesaid box and to sit on the aforesaid support means and to sit on a color board, wherein the said plurality of openings in the said grate is adapted to receive a plurality of game blocks slidably inserted therethrough.

2. An educational toy comprising a special purpose open top box having a bottom provided with a plurality of socket means adapted to receive a plurality of platform blocks removably inserted therein, said box being provided with support means mounted thereon which support means are adapted to support a color board and a grate; a plurality of platform blocks adapted to receive a plurality of game blocks removably placed thereon and having plug means provided thereon which plug means are adapted to be removably inserted into the aforesaid socket means in the aforesaid bottom of the aforesaid box for positioning, orienting and fixing the positions of the said plurality and platform blocks relative to the said bottom of the said box; a plurality of game blocks wherein a portion of the surface of each block is provided by painting or other suitable means with a distinctively colored figure corresponding in color to a color of a figure on a surface of a color board, the said game blocks being adapted to be slidably inserted through a plurality of openings in a grate and adapted to be removably placed on the aforesaid plurality of platform blocks and on a surface of a color board; a color board having a plurality of distinctively colored figures provided by painting or other suitable means on one surface thereof corresponding in colors to the aforesaid colors of the aforesaid figures on the aforesaid surfaces of the aforesaid plurality of game blocks, the said color board being adapted to be removably inserted into the aforesaid top of the aforesaid box and to sit on the aforesaid support means and adapted to receive a grate and the aforesaid plurality of game blocks removably placed on a surface thereof; and a grate having a plurality of openings therethrough and adapted to be removably inserted into the aforesaid top of the aforesaid box and to sit on the aforesaid support means and to sit on the aforesaid color board wherein the said plurality of openings in the said grate is adapted to receive the aforesaid plurality of game blocks slidably inserted therethrough.

3. An educational toy comprising a special purpose open top box having a bottom provided with a plurality of socket means in a spaced apart relationship which socket means are adapted to receive a plurality of platform blocks removably inserted therein, said box being provided with support means mounted thereon which support means are adapted to support a color board and a grate; a plurality of platform blocks having unequal lengths and adapted to receive a plurality of game blocks removably placed thereon and having bottoms provided with plug means mounted thereon which plug means are adapted to be removably inserted into any of the aforesaid plurality of socket means in the said bottom of the said box for positioning, orienting and fixing the positions of the said plurality of platform blocks relative to the said bottom of the said box; a plurality of game blocks having lengths inversely proportioned relative to the lengths of the aforesaid plurality of platform blocks wherein a portion of the surface of each block is provided by painting or other suitable means with a distinctively colored figure corresponding in color to a color of a figure on a surface of a color board, the said plurality of blocks being adapted to be slidably inserted lengthwise through any of a plurality of openings in a grate and adapted to be removably placed on the aforesaid plurality of platform blocks and on a surface of a color board; a flat color board having a plurality of distinctively colored figures provided by painting or other suitable means on one surface thereof in a spaced apart relationship corresponding to the aforesaid spaced apart relationship of the aforesaid plurality of socket means in the aforesaid bottom of the aforesaid box and corresponding in colors to the aforesaid colors of the aforesaid figures on the aforesaid surfaces of the aforesaid plurality of game blocks, the said color board being adapted to be removably inserted into the aforesaid open top of the aforesaid box and to be supported by the aforesaid support means and to substantially cover the said top of the said box and adapted to receive a grate and the aforesaid plurality of game blocks removably placed on a surface thereof; and a flat grate having a plurality of openings therethrough in a spaced apart relationship corresponding to the aforesaid spaced apart relationship of the aforesaid plurality of socket means in the aforesaid bottom of the aforesaid box and adapted to be removably inserted into the aforesaid open top of the aforesaid box and to be supported by the aforesaid support means and to sit on the aforesaid color board and to substantially cover the said top of the said box wherein the said plurality of openings in the said grate is adapted to receive the aforesaid plurality of game blocks slidably inserted lengthwise therethrough.

4. An educational toy comprising a special purpose, rectangular, open top box having four sides that intersect to form four interior corners and a bottom having a plurality of like rectangular openings in a spaced apart relationship therethrough adapted to receive a plurality of rectilinear posts slidably and removably inserted therein and four like, vertical, rectilinear, truncated corner posts seated against the said bottom of the said box and mounted in the said four interior corners of the said box which posts are adapted to support a color board and a grate; a plurality of rectilinear platform blocks having unequal lengths less than the lengths of the aforesaid truncated corner posts and adapted to receive a plurality of game blocks removably placed thereon and having bottoms provided with rectilinear posts mounted thereon and perpendicular thereto and adapted to be slidably and removably inserted into any of the aforesaid plurality of rectangular openings in the said bottom of the said box for positioning, orienting and fixing the positions of the said plurality of platform blocks relative to the said bottom of the said box; a plurality of rectilinear game blocks having lengths inversely proportioned relative to the lengths of the aforesaid plurality of platform blocks wherein the ends of each blocks are provided by painting or other suitable means with distinctively colored figures corresponding in color to a color of a figure on a surface of a color board, the said plurality of game blocks being adapted to be slidably inserted lengthwise through any of a plurality of openings in a grate and adapted to be removably placed on the aforesaid plurality of platform blocks and on a surface of a color board; a flat, rectangular color board having a plurality of distinctively colored figures provided by painting or other suitable means on one surface thereof in a spaced apart relationship corresponding to the aforesaid spaced apart relationship of the aforesaid plurality of rectangular openings in the aforesaid bottom of the aforesaid box and corresponding in colors to the aforesaid colors of the aforesaid figures on the aforesaid ends of the aforesaid plurality of game blocks, the said color board being adapted to be removably inserted into the aforesaid open top of the aforesaid box and sit on the aforesaid truncated corner posts and to substantially cover the said top of the said box and adapted to receive a grate and the aforesaid plurality of game blocks removably placed on a surface thereof; and a flat, rectangular grate having a plurality of rectangular openings therethrough in a spaced apart relationship corresponding to the aforesaid space apart relationship of the aforesaid plurality of rectangular openings in the bottom of the aforesaid box and adapted to be removably inserted into the aforesaid open top of the aforesaid box and to sit on the aforesaid truncated corner posts and to sit on the aforesaid color board and to substantially cover the said top of the said box wherein the said plurality of openings in the said grate is adapted to receive the aforesaid plurality of rectilinear game blocks slidably inserted lengthwise therethrough.

* * * * *